Figure 1:
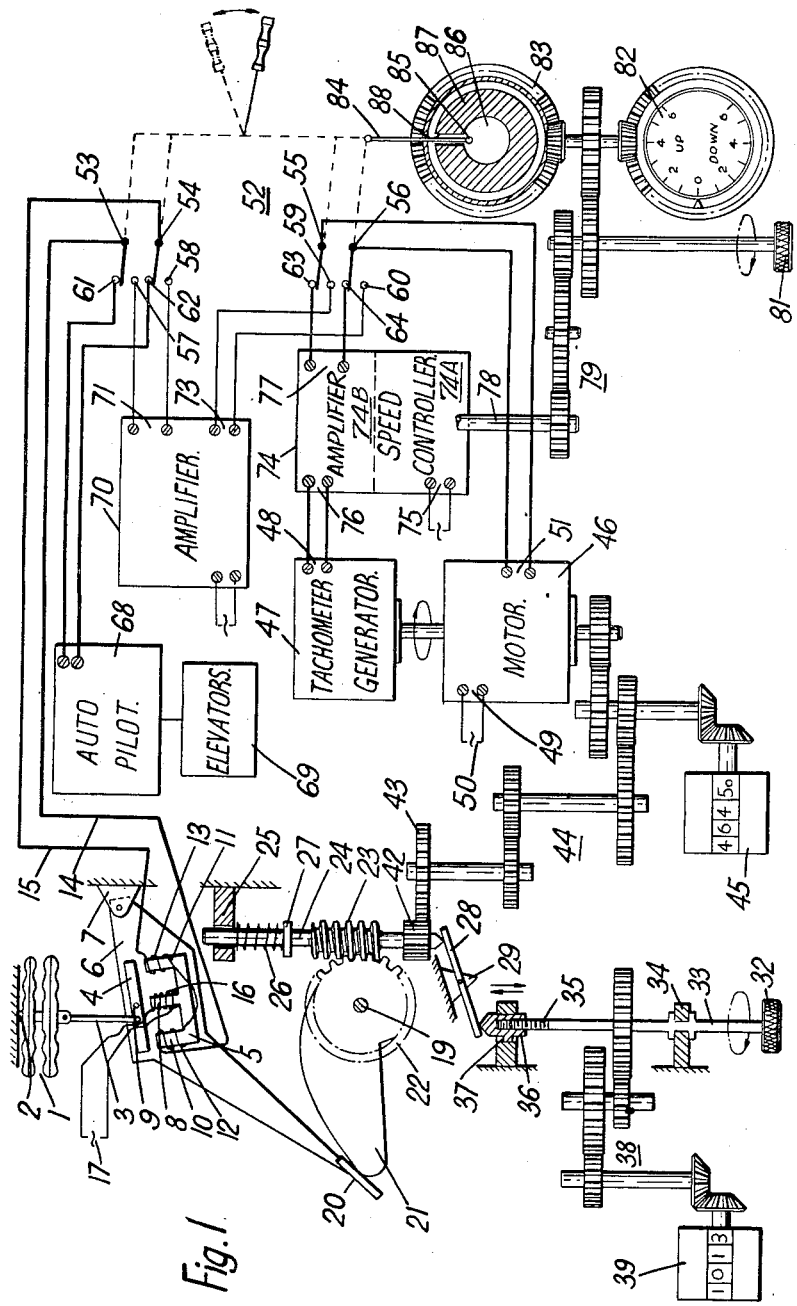

Oct. 9, 1962  A. M. A. MAJENDIE ETAL  3,057,583
CONTROL OF AIRCRAFT ALTITUDE
Filed Nov. 26, 1958  2 Sheets-Sheet 1

Inventor
A.M.A. Majendie
& J.S. Frankel
By Moore & Hall
Attorneys

Oct. 9, 1962 A. M. A. MAJENDIE ETAL 3,057,583
CONTROL OF AIRCRAFT ALTITUDE
Filed Nov. 26, 1958 2 Sheets-Sheet 2
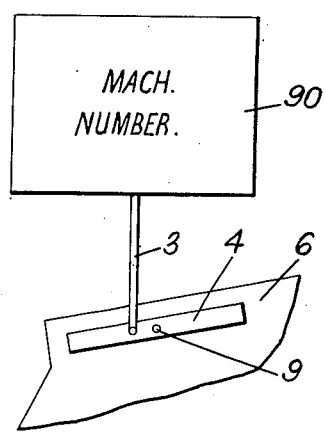
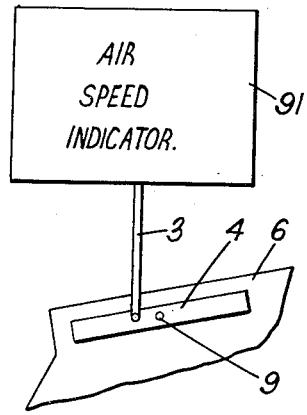
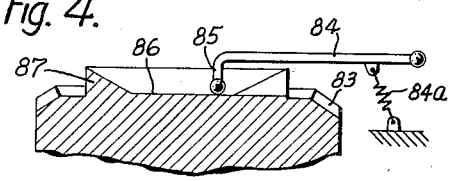
Inventor
A. M. A. Majendie
& J. S. Frankel
By Moore & Hall
Attorneys United States Patent Office 3,057,583
Patented Oct. 9, 1962

3,057,583
CONTROL OF AIRCRAFT ALTITUDE
Alastair Michael Adair Majendie, High Ridge, Winter Hill, Cookham Dean, England, and John Semon Frankel, 45 Tobyfield Road, Bishops Cleeve, Cheltenham, England
Filed Nov. 26, 1958, Ser. No. 776,635
2 Claims. (Cl. 244—77)

The present invention relates to the provision of means for the indication and control of a variable quantity in high performance automatically controlled aircraft.

According to the present invention we provide a control and indicating system comprising means to display an indicated value of a variable quantity, means, which may be generically referred to as a measuring device, responsive to an input signal applied thereto to change the said indicated value, means to control the actual value of the variable quantity in accordance with an input signal applied thereto, and means to apply either to the means to change the indicated value or to the means to control the actual value an input signal in acccordance with discrepancy between the indicated and actual value of the variable.

It will thus be seen that either the indicated value will be set to agree with the actual value, or the actual value will be controlled in order to maintain it at the indicated value, according as to the mode of operation required.

Preferably the system comprises also means to apply a settable demand signal to the means to change the indicated value when the discrepancy signal is applied to the means to control the actual value.

Preferably also means are provided to prevent the application of the demand signal to the means to change the indicated value unless the demand signal has been initially set to a value corresponding to zero rate of change of indicated value. Control and indicating systems for use in aircraft in accordance with the present invention will now be described with reference to the accompanying drawing of which FIGURE 1 shows in schematic form an electrical and mechanical system for the control and indication of altitude, FIGURE 2 shows a modification to enable the Mach number to be controlled and indicated, and FIGURE 3 shows a corresponding modification for indicated air speed.

FIGURE 4 shows a section through part of system shown in FIGURE 1.

Referring to FIGURE 1, a measuring device means such as a conventional sealed barometric capsule 1 has one outside face rigidly anchored (as indicated at 2) and is subject externally to the usual "static" pressure. The other outside face is connected, through a suitable temperature-compensating linkage (indicated at 3), to the I-bar 4 of a conventional E and I electrical pick-off. he E-bar 5 is carried by an arm 6 hinged about a rigid supporting bracket 7. I-bar 4 is pivoted at its mid-point 9 about a point on arm 6 in line with the central limb 8 of the E-bar. Linkage 3 is pivoted to I-bar 4 at a point slightly displaced from mid-point 9. The arrangement is such that either movement of linkage 3 or movement of arm 6 causes the ends of I-bar 4 to move in opposite senses in relation to the adjacent ends of the outer limbs 10, 11 of E-bar 5. The outer limbs 10, 11 carry coils 12, 13 respectively which are wired in series and connected to lines 14, 15. The central limb 8 carries a coil 16 which is connected to A.C. supply terminals 17.

Arm 6 carries a follower 20 which co-operates under the action of a restraining spring (not shown) with a cam 21 secured to a gear wheel 22 which is attached to a shaft 23 rotatably mounted in suitable bearings (not shown). Gear wheel 22 meshes with a worm gear 23 carried on a shaft 24 rotatably and slideably mounted in a bearing 25. A helical spring 26 surrounds shaft 24 and is compressed between a collar 27 on the shaft and bearing 25. The end of shaft 24 remote from bearing 25 has a conical form and engages one end of a lever 28 pivoted about a fixed support 29. Rotation of lever 28 about its pivot causes shaft 24 to slide longitudinally, the end of the shaft being maintained in engagement with lever 28 by the action of spring 26. Lever 28 is positioned by means of a setting knob 32 which is secured to a shaft 33 rotatably mounted in a bearing 34. The end of shaft 33 remote from knob 32 is provided with a screw thread indicated at 35, and engages with an internally threaded member 36. Member 36 is prevented from rotation by a peg and slot indicated at 37, and is formed with a conical portion positioned to engage the opposite end of lever 28 from knob 32. Rotation of knob 32 thus causes member 36 to move in the direction of the axis of shaft 33. Lever 28 is spring restrained, so as to remain in contact with member 36 at all times. Shaft 33 is connected by a gear train (indicated generally at 38) to a counter 39. The reading of counter 39 thus indicates the position of lever 28 and hence of shaft 24 as they are controlled by the setting of knob 32.

Shaft 24 carries adjacent to worm 23 a pinion 42 which meshes with a gear wheel 43. Pinion 42 is of sufficient extent to remain in engagement with gear 43 throughout the range of longitudinal movement of shaft 24. Gear wheel 43 is connected through a gear train (indicated generally at 44) to a counter 45 and an electric motor (indicated at 46). Motor 46 in addition to driving gear train 44 also drives a tachometer generator 47 which provides an output signal at terminals 48 whose magnitude and phase correspond respectively to the speed and direction of rotation of the armature of motor 46. Motor 46 has terminals 49 which are connected to a reference phase A.C. supply 50 and terminals 51 for connection to a control phase supply.

The system also comprises a four-section change-over switch 52 of which the moving contacts 53, 54 of the first and second sections are connected respectively to lines 14 and 15, and the moving contacts 55, 56 are connected respectively to motor terminals 51. When switch 52 is in a first position the moving contacts 53, 54, 55, 56 respectively engage fixed contacts 57, 58, 59, 60, and when the switch is in the second position they respectively engage fixed contacts 61, 62, 63, 64 (as shown in FIGURE 1). Contacts 61, 62 are connected to the pitch control channel (indicated at 68) of an auto-pilot which operates the elevators of the aircraft (indicated at 69). The auto-pilot is of a conventional kind and may be as described in British Patent No. 617,240 which corresponds to U.S. Patent No. 2,607,550. Contacts 57, 58 are connected to the input terminals 71 of an amplifier 70 whose output terminals 73 are connected to contacts 59, 60.

The system also includes a speed controller and amplifier (indicated at 74) of a conventional kind for the control of motor 46. The controller 74A has A.C. supply terminals 75, and the amplifier 74B has feed-back terminals 76, and output terminals 77. Terminals 75 are connected to a suitable A.C. supply, terminals 76 are connected respectively to terminals 48, and terminals 77 are connected respectively to contacts 63, 64. Controller 74A also has an input shaft 78 which is connected through a gear train indicated at 79 to a setting knob 81. Controller 74A comprises a potentiometer energised by the A.C. supply and providing an output whose magnitude and phase are controlled through knob 81 and input shaft 78. This output is combined in the amplifier 74B with the feed-back signal from generator 47 so that they oppose one another, the resultant error being amplified and appearing at terminals 77.

Gear train 79 also positions a suitably calibrated dial 82 and a gear wheel 83 in accordance with the setting of knob 81. Connected to switch 52 is a rod 84 which moves longitudinally when the switch is operated. A portion 85 of the end of the rod remote from switch 52 is bent at right angles. Rod 84 and gear wheel 83 are positioned so that rod 84 lies parallel to a face 86 of the gear wheel and also lies in a radial plane. The bent-over end of rod 84 is spring restrained by spring 84A into engagement with the face 86 of the gear wheel. FaFce 86 is formed with an annular raised portion 87 of triangular section (see also FIGURE 4). The height of the raised portion is greatest at its outside circumference and is reduced to zero at its inner circumference. Raised portion 87 is formed with a radial slot 88 along which the bent-over end of rod 84 may slide. When slot 88 is aligned with rod 84 dial 82 registers zero. The corresponding position of input shaft 78 is such that no signal is produced by controller 74. The arrangement is such that switch 52 may be moved from its second position to its first regardless of the setting of knob 81 because the end of rod 84 can slide up the inclined face of raised portion 87. The switch may, however, only move from its first position to its second when slot 88 is aligned with rod 84. When it is not aligned movement is prevented by the abutting of the bent-over end 85 against the outer edge of raised portion 87.

The manner of operation will now be described. Cam 21 and the connection to counter 45 are arranged so that when E-bar 5 and I-bar 4 are aligned the counter indicates the height of the aircraft as derived from the static pressure under an appropriate calibration law, e.g. the law specified by the "International Committee of Air Navigation" which law is set out on page 48 of the 10th edition of "Tables of Physical and Chemical Constants" by G. W. C. Kaye and T. H. Laby, published by Longmans. When the changeover switch is in its first position the signal from the pick-off is applied to amplifier 70 whose output is applied to motor 46. The motor operates to maintain the E- and I-bars in alignment so that the altitude indicated by counter 45 is the actual altitude of the craft (according to the calibration law). Owing to variations of atmospheric pressure which occur naturally from time to time, the reading provided by the counter 45 will vary even if the aircraft remains still on the ground. To compensate for this at the start of a flight, the counter 45 is set to the correct altitude by adjusting the knob 32 to set the counter 39 according to the current barometric pressure at ground level. This action causes worm 23 to move longitudinally rotating cam 21 and misaligning the pick-off. Motor 46 immediately re-aligns the pick-off causing counter 45 to register the correct altitude.

When the changeover switch is in its second position and no signal is produced by controller 74 the output from the pick-off is applied to the elevators through the auto-pilot to maintain the aircraft at the altitude indicated by counter 45. If the controller is set by knob 81 so that motor 46 rotates then the indicated altitude and the position of E-bar 5 vary accordingly. The pick-off signal applied to the pitch channel of the automatic pilot controls the altitude of the aircraft to maintain the two parts of the pick-off in alignment, i.e. to maintain the aircraft at the indicated altitude, which will now be changing at a rate corresponding to the controller signal. Thus the setting of knob 81 and indicator 82 is indicative of a demanded rate of change of height, and the scale associated with it may be calibrated accordingly.

Thus in the first position of the switch the aircraft altitude is controlled by means with which the present invention is not concerned, and the device of the present invention functions purely as an indication of that altitude. In the second position of the switch, the invention provides an automatic control of altitude, the actual altitude being always, in normal circumstances, also indicated thereby; and a desired rate of change of altitude may be readily set. It will be appreciated that gear 83 and the rod 84 ensure that automatic height control cannot be engaged with a demand for a non-zero rate of change of height operative.

It may be convenient to provide indicating means to show when the signal from the pick-off exceeds some small predetermined value, and thus indicate any discrepancy between the actual and indicated altitude.

Referring to FIGURE 2, the system may be applied to the control and indication of Mach number if a conventional Mach number indicator mechanism 90 is substituded for capsule 1 in the control of linkage 3. A similar modification may be made in which an air speed indicator mechanism 91 controls linkage 3 (FIGURE 3). In both these modifications knob 32 and its attendant mechanism may be dispensed with and shaft 24 prevented from sliding by a suitable stop.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

What we claim is:

1. A control and indicating system comprising an indicating device for displaying the magnitude of a quantity and having an input shaft for varying the magnitude displayed, a measuring device for generating a signal representing the magnitude of a varying quantity, a differential device having two signal inputs and a signal output and operative to generate an electric signal at said output representing the difference between the magnitude of quantities represented by signals applied to said inputs, means for applying the signal generated by the measuring device and a signal representing the magnitude displayed by the indicating device to the signal inputs of the differential device, an electric motor having an output shaft, a mechanical linkage coupling the output shaft of the motor to the input shaft of the indicating device, an electric signal path for applying the signal generated by the differential device to said motor to cause motion thereof to vary the magnitude displayed by the indicating device in the sense required to produce the output of the differential device towards zero, the signal path comprising switching means having first and second switching conditions and connected in said signal path to close it only when the switching means is in its first condition, an automatic control system adapted to respond to an electric signal to control the magnitude of said variable quantity, said switching means in its second condition serving to break the signal path and simultaneously to apply the signal generated by the differential device to the automatic control system in the sense required to control said variable quantity to reduce said signal towards zero, manually operable adjusting means for generating an adjustable demand signal, a servo loop for controlling the operation of the motor when said switching means is in its second condition, the loop comprising said switching means and being closed only when the switching means is in said second condition and further including a tachometer generator for generating an electric signal, the magnitude of which depends upon the speed of the motor, an amplifier having an input and an output, means for applying the signal generated by the tachometer generator and an electric signal representing the said demand signal in opposite senses to the input of the amplifier and means coupling the output of the amplifier to the motor to control the operation of the motor in the manner required to reduce the difference between the amplifier input signals towards zero and thereby to adjust the magnitude displayed by the indicating device at a rate dependent on the magnitude of said demand signal.

2. A system for indicating and controlling the altitude of an aircraft having a control surface for controlling the aircraft's attitude in pitch, the system comprising an indicating device for displaying the aircraft's altitude, a measuring device for generating a signal representing the aircraft's altitude, a differential device having two signal inputs and a signal output and operative to generate an electric signal at said output representing the difference between the magnitudes of quantities represented by signals applied to said inputs, means for applying the signal generated by the measuring device and a signal representing the altitude displayed by the indicating device, to the signal inputs of the differential device, an electric motor having an output shaft, a mechanical linkage coupling the output shaft of the motor to the input shaft of the indicating device, an electric signal path for applying the signal generated by the differential device to the said motor to cause motion thereof to vary the altitude displayed by the indicating device in the sense required to reduce the output of the differential device towards zero, the signal path comprising switching means having first and second switching conditions and connected in said signal path to close it only when the switching means is in its first condition, an automatic control system for actuating said control surface in dependence upon the magnitude of an electric signal, said switching means in its second condition serving to break the signal path and simultaneously to apply the signal generated by the differential device to the automatic control system in the sense required to vary the aircraft's pitch attitude and hence its altitude in the manner necessary to reduce the said signal towards zero, manually operable adjusting means for generating an adjustable demand signal representing a demanded rate of change of altitude, a servo loop for controlling the operation of the motor, the loop comprising said switching means and being closed only when the switching means is in its second condition and further comprising a tachometer generator for generating an electric signal, the magnitude of which depends upon the speed of the motor, an amplifier having an input and an output, means for applying the signal generated by the tachometer generator and an electric signal representing the said demand signal in opposite senses to the input of the amplifier and means coupling the output of the amplifier to the motor to control the operation of the motor in the manner required to reduce the difference between the amplifier input signals towards zero and thereby to adjust the altitude displayed by the indicating device at a rate dependent on the magnitude of said demand signal.

References Cited in the file of this patent

UNITED STATES PATENTS

| | | |
|---|---|---|
| 2,126,855 | Wunsch et al. | Aug. 16, 1938 |
| 2,143,139 | Carlson et al. | Jan. 10, 1939 |
| 2,352,649 | Meredith | July 4, 1944 |
| 2,597,892 | Nash | May 27, 1952 |